No. 692,879. Patented Feb. 11, 1902.
H. LEMP.
STEERING MECHANISM FOR AUTOMOBILES.
(Application filed June 28, 1901.)
(No Model.) 3 Sheets—Sheet 1.
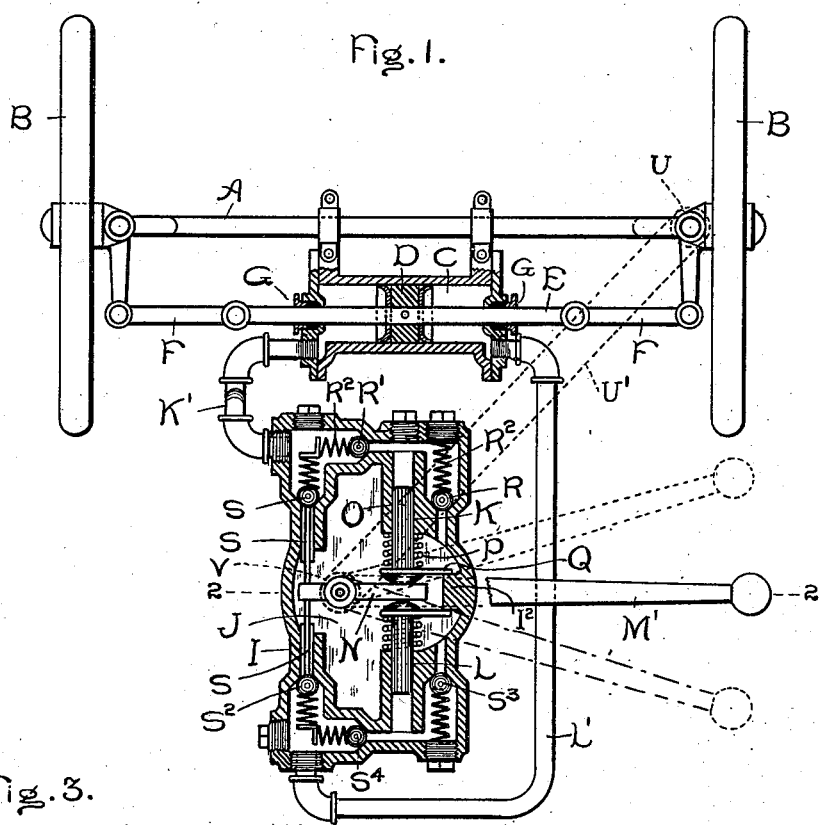
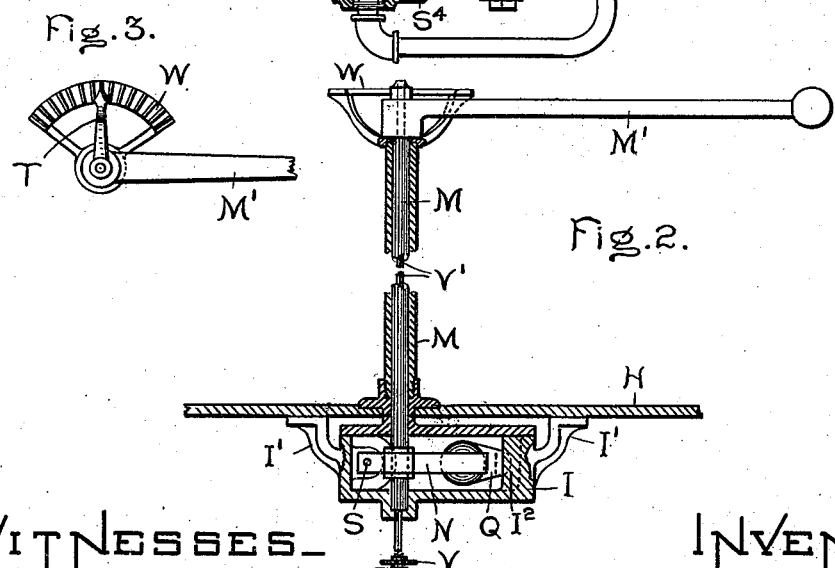
WITNESSES
Benjamin B. Hull,
Alex F. Macdonald.
INVENTOR.
Hermann Lemp,
By Albert G. Davis,
Atty.

No. 692,879. Patented Feb. 11, 1902.
H. LEMP.
STEERING MECHANISM FOR AUTOMOBILES.
(Application filed June 28, 1901.)
(No Model.) 3 Sheets—Sheet 2.
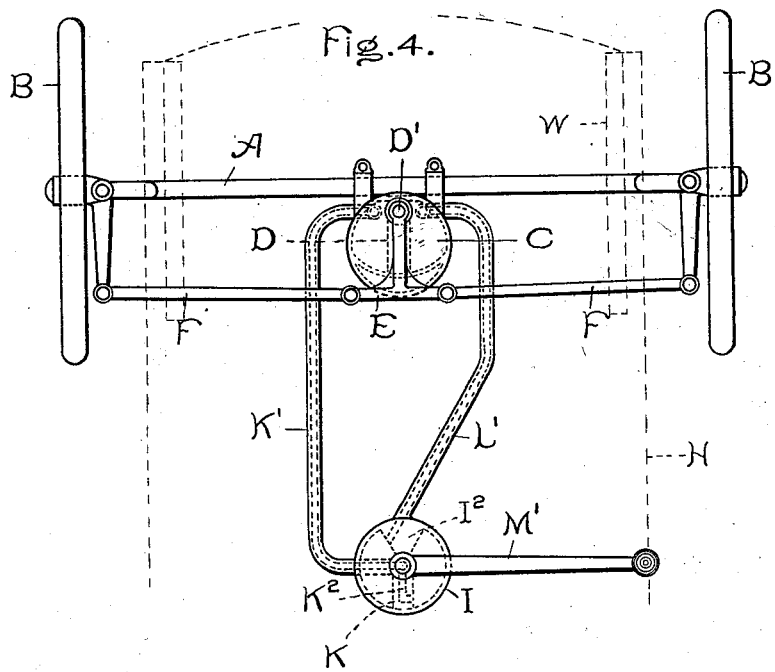
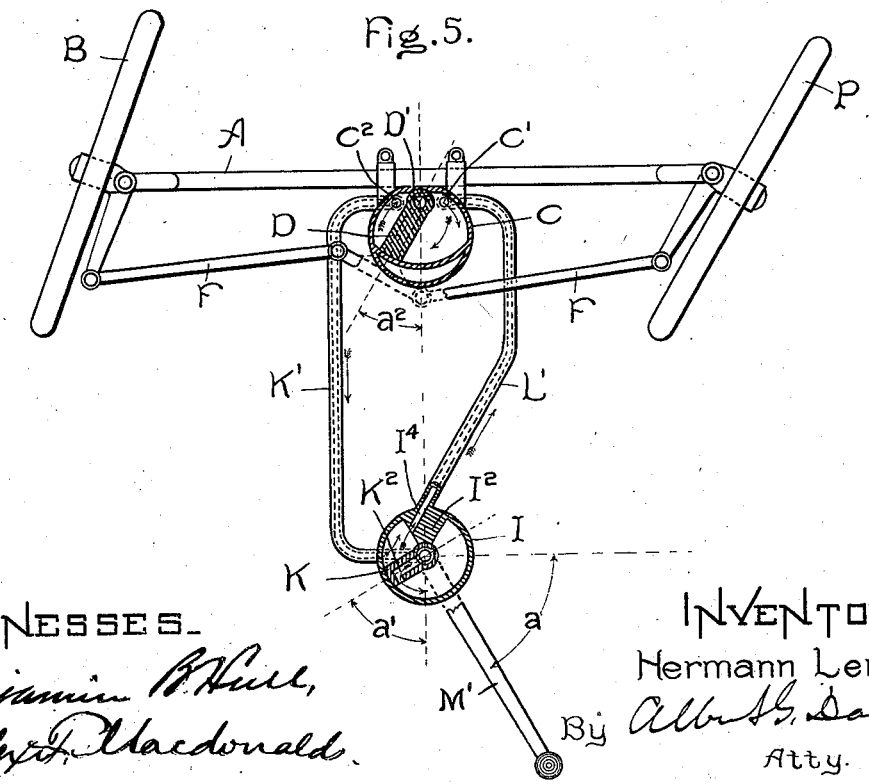
WITNESSES
Benjamin B. Hull,
Alex F. Macdonald
INVENTOR
Hermann Lemp,
By Albert G. Davis,
Atty.

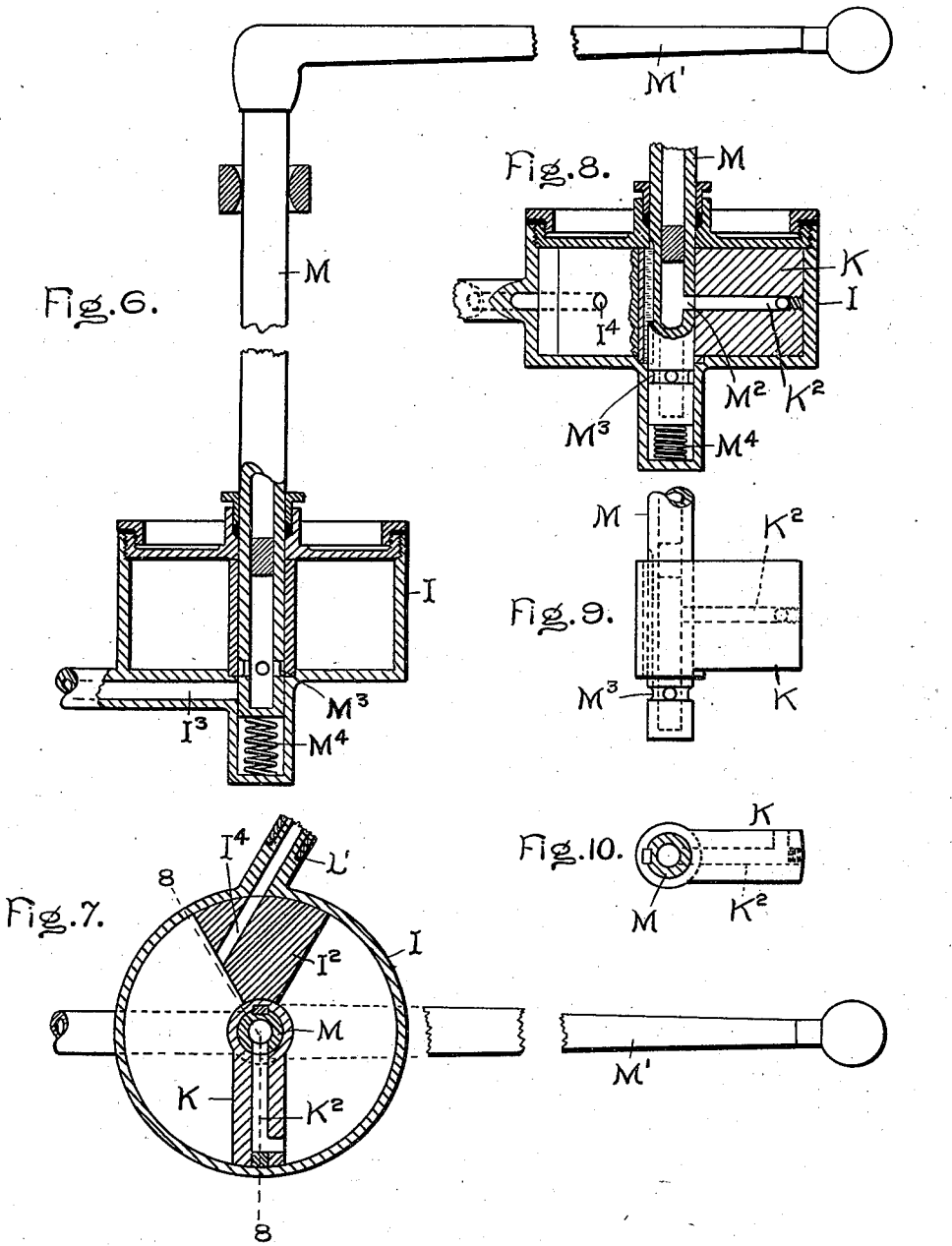

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

STEERING MECHANISM FOR AUTOMOBILES.

SPECIFICATION forming part of Letters Patent No. 692,879, dated February 11, 1902.

Application filed June 28, 1901. Serial No. 66,327. (No model.)

*To all whom it may concern:*

Be it known that I, HERMANN LEMP, a citizen of the United States, residing at Lynn, county of Essex, State of Massachusetts, have invented certain new and useful Improvements in Steering Mechanism for Automobiles, (Case No. 1,964,) of which the following is a specification.

In connection with heavy trucks and the like steering mechanisms have been devised into which gears of one sort and another enter, the object of the gearing being to increase the leverage between the steering-handle and the wheels. In addition to this the gearing acts as a lock to prevent the wheels from transmitting motion back to the steering-handle, thereby preventing the strains on the hand of the operator which would otherwise take place. The steering-handle or other actuating device is arranged to make a greater angular movement than the wheels in order to compensate for the increase in leverage. With mechanism of this general class there is necessarily a slight amount of lost motion, and as the gears wear this increases until it becomes an important consideration.

My invention has for its object to dispense with the gearing between the steering-handle and the wheels and to substitute therefor a power-transmitting system wherein any desired difference in leverage may be obtained without the disadvantage of an ever-increasing lost motion as the parts become worn, and this without in any way sacrificing the locking feature of the gearing.

In carrying out my invention I utilize a body of fluid for transmitting motion from the steering member to the steering wheel or wheels, which fluid is constant in amount and when not actually engaged in moving the wheels is in a quiescent state and possesses no potential energy.

In the accompanying drawings, which illustrate an embodiment of my invention, Figure 1 is a plan view, partially in section, of a steering mechanism embodying my invention. Fig. 2 is a vertical section taken on the line 2 2 of Fig. 1. Fig. 3 is a detail plan view of an indicator for indicating the position of the steering-wheels. Fig. 4 is a plan view of a slight modification of the steering mechanism. Fig. 5 is also a plan view showing the wheels set at an angle. Fig. 6 is a partial vertical section of one of the motors on an enlarged scale. Fig. 7 is a transverse section thereof. Fig. 8 is a section taken on line 8 8 of Fig. 7. Fig. 9 is a side elevation of the piston, and Fig. 10 is a plan view thereof.

Referring to the drawings by letter, A represents the fixed axle or support, and mounted in hangers carried by the ends thereof are short axles carrying the steering-wheels B. It being customary to employ two wheels for steering a heavy vehicle, I have shown two in the drawings; but it is to be understood that my improved mechanism can be used in connection with a single steering-wheel, if so desired.

Rigidly secured to the front axle is a fluid-pressure motor comprising a cylinder C and a piston D. Extending through and rigidly secured to the piston is a rod E, which rod is pivoted by links F to the short axles of the steering-wheels. The piston-rod E passes through suitable stuffing-boxes G in the cylinder. The apparatus described is entirely carried by the front axle of the vehicle-frame.

Situated on the spring-supported body of the vehicle at some convenient place, preferably underneath the floor H, is the motor device for creating the necessary fluid-pressure to move the piston D, and therefore the steering-wheels, from one position to another. This motor device has a casing I, which is provided with brackets I', Fig. 2, for securing it to the floor or beams of the vehicle-body. The casing is provided with a large central chamber J, having ample capacity to receive the fluid and also to provide against any slight leaks. Mounted within the casing and submerged in the fluid are two single-acting pumps K and L, the former being employed when it is desired to steer the vehicle to the left and the latter to the right. Connection between the pumps and the cylinder D on the axle is made by flexible pipes K' and L'. This allows for movements of the vehicle-body independent of the frame carrying the wheels—such as are due to the springs, for example. Extending vertically through the casing and provided with suitable bearings is a steering-shaft M, and to the upper end of the shaft is secured the steering handle or lever M'. Mounted on the lower end of the steering-shaft and located within the casing is a pump-actuator N. This actuator is rigidly connected to the shaft, and consequently moves with the steering-handle M'. The pumps K and L are similar in construction, one being mounted on one side of the actuator N and the other on the opposite side. The casing I is bored out at O to receive the piston K, which piston is normally pressed against the actuator by a coiled compression-spring P. The end of the piston adjacent to the actuator is provided with an arm Q, which engages with the stop or abutment I², formed on the inside of the casing. The pump is controlled by a ball admission-valve R and a delivery-valve R', which valves are normally held closed by compression-springs R², and by changing the position of the abutments the tension on the valves may be varied as desired. It is important that the valves and pistons shall be submerged at all times in the fluid contained in the casing, so as to prevent air from getting into the system and acting as a cushion. The actuator N projects to the left beyond the steering-shaft, and mounted on each side of this extension are rods S, which are arranged to open the spring-pressed check-valves S' or S² each time the actuator is moved from a central position. The object of these check-valves is to permit the return of fluid from the cylinder C on the axle to the main chamber J on the vehicle-body when the act of steering takes place under the control of the steering-handle M'. These valves also serve to check the fluid circulation when for any cause the steering-wheels attempt to move independent of the steering-handle—such, for example, as when an obstruction is met in the road. They also serve to check the circulation of fluid when the hand of the operator is removed from the steering-lever. The coiled compression-springs, which serve to hold the pistons K and L in their respective places, serve a double function—i. e., that of returning the pistons to their initial positions and of centralizing the actuator N and steering-handle M'. The chamber J, cylinder C, and pipes K' and L', together with minor chambers formed in the casing I, are filled with glycerin or some similar fluid which will not freeze. The pipes K' and L' need only have a small carrying capacity, as it is intended that the movement of the steering-wheels shall be relatively slow. The steering is accomplished by a series of short strokes given to the handle M', which action may be likened to that of a ratchet and pawl. The relative areas of the pump-pistons K and L and the wheel-actuating piston D may be anything that is desired. A relation of about five to one, however, will be found to be satisfactory.

Trucks and vehicles of a like nature are frequently provided with relatively high seats for the operator, and when gearing is employed in the steering mechanism it necessitates the use of long shafts or other moving parts, which add to the difficulty of maintenance. By my invention I am able to dispense with these shafts and the mechanism on the vehicle-body can be located at any desired distance from that on the axle. The pipes K' and L', the only mechanical connection between the steering mechanisms, being small and flexible, permit the parts to be located wherever it is the most convenient. When the vehicles are provided with high seats, it becomes more or less difficult for the operator to see the angular position which the steering-wheels occupy, even by making a special effort, and to meet this objection an indicator T is provided. Mounted on one of the vertical steering-shafts is a sprocket-wheel U, which is connected by a chain U' (shown in dotted lines) with a sprocket V, mounted on the lower end of the shaft V'. The shaft V' extends upward through the steering-shaft M, and mounted on the top thereof is the indicator or pointer T. The latter is arranged to move to and fro over a dial-plate W, which is mounted on the steering-shaft support, as the steering-wheels change their angular position. The indicator will be found to be useful in connection with steering mechanisms other than the one shown, and the improvement is not to be construed as being limited to the apparatus illustrated.

The action of my invention is as follows: Assuming that it is desired to steer the vehicle to the left, the steering-handle M' is moved back and forth between the positions shown in full lines and those in dotted. The shorter the stroke, the smaller will be the angular deflection of the steering-wheels. This action causes the pump K to act, the pump L remaining inactive. As the handle is forced from the full-line position toward the dotted-line position the rod S, pressing against the check-valve S², causes it to open. At the same time the fluid in the pump-cylinder O is forced past the check-valve R' into the left-hand side of the cylinder through the flexible pipe K'. This will impart a certain amount of movement of the piston D, depending upon the displacement of the pump. If the movement produced on the steering-wheels is insufficient, the handle is returned to the full-line position and is again forced to the dotted-line position, which in turn forces more fluid into the left-hand side of the cylinder. This particular steering device being intended for heavy trucks and the like, the areas of the pistons K and L are small as compared to that of the piston D. By changing the areas of these pistons any desired degree of leverage may be obtained between the steering-handle and the steering-wheels. As the piston D moves to the right it displaces the fluid contained in the right-hand side of the cylinder, and it is forced through the pipe L', past the check-valve S², into the chamber J, the amount of fluid which is thus displaced being dependent upon the movement of said piston. As the pump-piston moves back to its initial position the check-valve R opens and breaks the vacuum which would otherwise be created. It will be seen that each time the steering-handle is moved from the central position the check-valve $S^2$ is opened, and that as soon as the handle $M'$ is brought to the central position it is automatically closed. In steering the vehicle the hand $M'$ is moved back and forth manually; but if for any reason the hand is removed from the handle the compression-springs P will return it to its central position, thus permitting the spring-pressed check-valves $S^2$ to close and the wheels will be locked against road thrusts. In steering the vehicle to the left the steering-handle is moved from a central position forward, while to steer the vehicle to the right the steering-handle is moved back and forth between the position shown in full lines to the one illustrated in broken and dotted lines, the action of the pump L and the check-valves $S'$, $S^3$, and $S^4$ being similar to that of the pump K and check-valves R, $R'$, and $S^2$. If by any chance during the act of steering the wheels meet with a road obstruction which tends to move the wheels backward with a force greater than that exerted on the handle $M'$, the piston D will tend to move either to the right or left, as the case may be, which will create a back pressure sufficient to move the piston K or L against the action of the actuator N and close the check-valve $S'$ or $S^2$. This will not interfere with the steering, since to move the wheels a substantial amount a number of short strokes of the handle $M'$ are required. As the wheels are deflected from a central position motion is imparted to the indicator T by means of the sprockets U, V, and the chain $U'$, and by comparing the position of the pointer T with the dial-plate the relation of the steering-wheels can readily be seen.

In Figs. 4 to 10, inclusive, is shown a slightly-modified form of my invention, but the same broad principle is followed in both cases. A represents the fixed axle or support, and mounted on the ends thereof are hangers for the short axles that carry the steering-wheels B. At an intermediate point on the support A is mounted a cylinder C, containing a vane or piston D, which is mounted for movement on a vertical shaft $D'$. The shaft $D'$ is seated at the lower end in a bearing formed in the casing and at the upper end passes through the cover of the cylinder. Rigidly secured to the upper end of the shaft is a frame E, which connects the piston with the steering-wheels through the rods F. In the cylinder C are ports $C'$ and $C^2$, Fig. 5, which are always open and serve to permit the entrance and exit of glycerin or other fluid thereto. Mounted on the body of the vehicle in any suitable place is a second cylinder or casing I, containing a piston K, and this cylinder is connected by small flexible pipes $K'$ and $L'$ with the one on the axle. The motor-casing I is mounted on the floor of the vehicle-body, which body is supported by springs W. (Shown in dotted lines, Fig. 4.) The flexible pipes $K'$ and $L'$ permit the body and framework to move independently of each other. The piston K moves about a vertical axis, and when taken in conjunction with the fixed projection $I^2$ divides the cylinder into two chambers, which vary more or less in size, depending upon the position of the piston. The piston is splined on the steering-shaft M, so that the two are free to move vertically with respect to each other, but not angularly. The lower end of the steering-shaft is hollow and coöperates with the passage $K^2$ in the piston by means of the hole $M^2$, Fig. 8. Around the lower end of the shaft is cut a groove $M^3$, which is in free communication with the receptacle in the shaft. On the under side of the cylinder or casing C is formed a projection which contains a passage $I^3$, that communicates with the flexible pipe $K'$, leading to the cylinder in the front axle. Situated below the closed end of the handle is a coiled spring $M^4$, which normally holds the handle in the raised position, Fig. 6, thus closing the entrance to passage $I^3$. In other words, the parts are in a position to check the transfer of fluid from one portion of the system to another. In Fig. 8 the steering-handle is shown in the depressed position, so that the hole $M^2$ in the shaft is opposite the passage $K^2$ in the piston. The groove $M^3$ is opposite the passage $I^3$ of the chamber, so that fluid in the right-hand chamber in the piston is free to flow into the flexible pipe $K'$. The partition $I^2$ in the cylinder is provided with an opening or port $I^4$, which communicates freely with the flexible pipe $L'$. When the handle is in the raised position, there are two separate bodies of quiescent fluid, each confined to a limited space. Hence any tendency of the wheels to change their angular position with respect to the vehicle-body is checked because the fluid is non-compressible. In Figs. 4 and 5 the parts are shown as being mounted on a vehicle and the area of the manually-actuated piston K is somewhat less than that of piston D. This means that the former will have to move through a proportionally greater arc for a given deflection of the wheels. I can of course vary the areas of the pistons to suit any given condition. Assuming that it is desired to move the steering-wheels, the handle $M'$ is depressed, which opens the valve by placing the various passages and openings in communication. The handle is then moved to the right or left, as the case may be, and fluid is forced from one chamber in the casing I into the cylinder C on the axle. This causes a deflection of the piston D, and consequently of the wheels B. The pipes $K'$ $L'$ and openings $I^3$ $I^4$ are so arranged that a movement of the handle in one direction causes a corresponding movement of the wheels. In other words, the connection is between the left-hand side of one cylinder and the right-hand side of the other cylinder. Referring to Fig. 5, the handle M' is shown as having been moved through an angular distance equal to $a$. This causes a corresponding angular movement $a'$ of the piston K. On the other hand, the piston D, which is directly connected to the wheels, has only moved through an angular distance equal to $a^2$. By moving the handle M' in the opposite direction it will move the wheels in the opposite direction.

What I claim as new, and desire to secure by Letters Patent of the United States, is—

1. In combination two elements which are movable with respect to each other, a body of fluid, manually-actuated means for moving the elements with respect to each other through the medium of the fluid, and locking means which automatically locks the elements when one element tends to move with respect to the other due to an extraneous means, and this without regard to the position of the manually-actuating means.

2. In combination a vehicle body and axle movable with respect to each other, a wheel capable of moving independent of the body and axle, hydraulic motive devices mounted on the axle and vehicle-body, a body of fluid which has no potential energy for transmitting motion from one element to the other, and manual means for creating the necessary fluid-pressure when it is desired to move the wheel with respect to the axle.

3. In combination a pair of elements movable with respect to each other, a hydraulic motive device for each element for transmitting motion from one element to the other, fluid-transmitting means which connect opposite sides of the motive devices, a manually-actuated means for creating the necessary fluid-pressure, a valve for regulating the transfer of fluid which is opened by the said manually-actuated means, and means for closing the valve automatically.

4. In a device for causing synchronous movements, the combination of a pair of fluid-pressure motors, supports for the motors which are capable of independent movements, means for connecting the supports in a manner to permit one to move with respect to the other, a body of fluid, and manually-actuated means for imparting pressure to the fluid through one of the motors.

5. In a device for causing synchronous movements, the combination of a pair of fluid-pressure motors, supports for the motors which are capable of independent movements, means for uniting the supports, a body of fluid, and manually-actuated means for imparting pressure to the fluid through one of the motors, means for admitting to the second motor the fluid which is delivered by the first, and means for admitting to the first motor the exhaust from the second.

6. In a motion-transmitting device, the combination of a pair of cylinders, pistons of different areas for the cylinders, separate supports for the cylinders which are capable of independent movement, springs secured to and connecting the supports, a manually-actuated handle which is operatively connected to one of the pistons, pipes for conveying fluid from one motor to the other, and a valve controlled by the handle for controlling the fluid circulation.

7. In a steering mechanism, the combination of a fixed support, wheels carried thereby, a motor mounted on the support and operatively connected to the wheels, a vehicle-frame, a motor mounted thereon, a body of fluid, means for conveying fluid between the two motors, a steering-handle which is connected to one motor in such manner that pressure may be imparted to the fluid, and an automatically-operating valve which cuts off the transfer of fluid from one motor to another.

8. In a motion-transmitting device, the combination of two elements which are movable with respect to each other, means for uniting the parts in such manner that they can move with respect to each other, and fluid-pressure motors for the elements, one of said motors being provided with a single piston, while the other is provided with two pistons.

9. In combination, a pair of elements which are movable with respect to each other, a fluid-pressure motor which is provided with a single piston and is mounted on one element, and is connected to the other in a manner to move it, a third element, a second motor mounted thereon which is provided with two pistons, and means so arranged that when one of the pistons of the second motor is active the other is idle.

10. In combination a pair of elements which are movable with respect to each other, a motor for each element, and a manually-actuated handle for creating the necessary energy in one motor to drive the other, the handle being so arranged that movement one side of a given position causes the two elements to move in one direction with respect to each other, while movement of the handle on the opposite side of the given position causes movement of the elements in the opposite direction.

11. In combination, elements which are movable with respect to each other, a fluid-pressure motor for each of said elements, each motor comprising a piston and cylinder, means whereby a number of piston-strokes of one motor is required to give the maximum stroke to the piston of the other motor or motors, and a valve which is manually opened on each delivery-stroke of the piston, and closes automatically.

12. In combination, elements which are movable with respect to each other, a piston and cylinder for one of the elements, a pair of pistons and cylinders for another element, and an actuator which can be operatively connected to either of the last-mentioned pistons, and is arranged to actuate one piston for moving the elements in one direction from a given position, and to actuate the other piston for moving the elements in another direction.

13. In combination, elements which are movable with respect to each other, a fluid-motor for one of the elements, a fluid-motor for another element comprising a piston and cylinder, an actuator for the piston, and means for automatically returning the actuator and piston to their initial positions.

14. In combination, elements which are movable with respect to each other, a fluid-motor for one of the elements, a fluid-motor for another element comprising a pair of pistons and their respective cylinders, an actuator mounted in a manner to operate both of the pistons, and springs acting on the pistons and actuator to return them to their initial positions.

15. In combination, elements which are movable with respect to each other, a fluid-motor for each of the elements, a body of fluid for transmitting motion from one motor to the other, manually-actuating means for one of the motors, an automatic check-valve which controls the fluid delivered by one of the motors, and a manually-controlled valve which controls the exhaust of one of the motors, and closes each time pressure is removed from the motor-actuating means.

16. In a steering mechanism for vehicles, the combination of a motor comprising a piston and cylinder mounted on a fixed part of the frame, a connection from the motor to the steering-wheel, a second motor comprising a pair of pistons and cylinders which are mounted on the vehicle-frame, a manual actuator operating the pistons of the second motor, oppositely-acting valves which are controlled by the actuator, one of the valves remaining idle while the other is active, and automatic valves for controlling the transmission of fluid from one motor to the other.

In witness whereof I have hereunto set my hand this 25th day of June, 1901.

HERMANN LEMP.

Witnesses:
ALEX. F. MACDONALD,
DUGALD McK. McKILLOP.